United States Patent
Summa et al.

(10) Patent No.: US 8,213,073 B2
(45) Date of Patent: *Jul. 3, 2012

(54) CONTINUOUSLY TUNABLE OPTICAL DISPERSION COMPENSATION SYNTHESIZERS USING CASCADED ETALONS

(75) Inventors: Mark Summa, Painted Post, NY (US); Peter Gerard Wigley, Corning, NY (US); Aravanan Gurusami, Painted Post, NY (US); Ghang-Ho Lee, Painted Post, NY (US); Douglas Lleweilyn Butler, Painted Post, NY (US); Robert David Paul Ridding, Horseheads, NY (US); Timothy Kent Zahnley, Spencer, NY (US)

(73) Assignee: Oclaro (North America), Inc., San Jose, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 12/592,812

(22) Filed: Dec. 3, 2009

(65) Prior Publication Data
US 2010/0165438 A1    Jul. 1, 2010

Related U.S. Application Data

(63) Continuation of application No. 11/977,798, filed on Oct. 26, 2007, now Pat. No. 7,706,045.

(51) Int. Cl.
G02F 1/03     (2006.01)
G02F 1/01     (2006.01)
G02B 26/00    (2006.01)

(52) U.S. Cl. ............. 359/260; 359/269; 359/290
(58) Field of Classification Search .......... 359/247, 359/260–261, 275, 282, 288
See application file for complete search history.

(56) References Cited

U.S. PATENT DOCUMENTS

| | | |
|---|---|---|
| 6,289,151 B1 | 9/2001 | Kazarinov et al. |
| 6,487,342 B1 | 11/2002 | Wu et al. |
| 6,519,065 B1 | 2/2003 | Colbourne et al. |
| 6,724,482 B2 | 4/2004 | Wu |
| 6,748,140 B1 | 6/2004 | Wu et al. |
| 6,904,196 B1 | 6/2005 | Sorin et al. |
| 7,050,671 B1 | 5/2006 | Zhang et al. |
| 7,711,219 B2 * | 5/2010 | McDonald et al. ............. 385/27 |
| 2003/0099019 A1 | 5/2003 | Zhang et al. |

(Continued)

FOREIGN PATENT DOCUMENTS

JP    2003-107417 (A)    4/2003

(Continued)

OTHER PUBLICATIONS

European Patent Application No. 08167648.8 Extended Search Report (Oct. 27, 2011).

(Continued)

*Primary Examiner* — Dawayne A Pinkney
(74) *Attorney, Agent, or Firm* — Patterson & Sheridan, L.L.P.

(57) ABSTRACT

Described is a method for designing individual stages of a multiple cascaded etalon TDC device to allow continuous thermo-optic tuning over a desired range without inducing incremental signal distortion due to uncontrolled and unpredictable dispersion of the TDC during tuning. This allows the signal to transmit without encountering periods of incremental distortion or dark spots. The method includes prior knowledge of each etalon stage, after full assembly, for spectral group delay profile as a function of temperature through modeling and/or characterization. Characterization can account for performance variations that are due to allowed manufacturing tolerances.

11 Claims, 8 Drawing Sheets

U.S. PATENT DOCUMENTS

| | | | |
|---|---|---|---|
| 2006/0245690 A1* | 11/2006 | Yang et al. ............... | 385/27 |
| 2007/0230855 A1 | 10/2007 | McDonald et al. | |
| 2009/0067783 A1 | 3/2009 | Webb et al. | |

FOREIGN PATENT DOCUMENTS

| | | |
|---|---|---|
| JP | 2005-049532 (A) | 2/2005 |
| JP | 2005-049856 (A) | 2/2005 |
| JP | 2006-053519 (A) | 2/2006 |
| JP | 2007-171770 (A) | 7/2007 |

OTHER PUBLICATIONS

Japanese Patent Application No. 2008-274203 Official Action (Feb. 2, 2011) (English translation attached).

\* cited by examiner

| Etalon Number | Temperature (C) | Delta FSR from 100GHz (MHz) | Surface 1 Reflectivity | Msmt offset (ps) | Msmt slope (ps/nm) | Fit Error Sum^2 (ps) |
|---|---|---|---|---|---|---|
| 1 | 40 | 2.78E+07 | 0.309118 | -2.75E-12 | 0.0001889 | 1.13E-13 |
| 1 | 75 | 5.19E+06 | 0.309118 | -2.61E-12 | -0.0000685 | 8.15E-14 |
| 1 | 115 | -2.19E+07 | 0.309118 | -2.78E-12 | 0.0001294 | 1.27E-13 |
| 2 | 40 | 2.84E+07 | 0.314557 | -2.78E-12 | 0.0004490 | 9.64E-14 |
| 2 | 75 | 6.15E+06 | 0.314557 | -2.56E-12 | -0.0000926 | 8.19E-14 |
| 2 | 115 | -2.04E+07 | 0.314557 | -2.86E-12 | 0.0001556 | 1.25E-13 |
| 3 | 40 | 2.83E+07 | 0.304139 | -2.91E-12 | 0.0001284 | 9.87E-14 |
| 3 | 75 | 6.21E+06 | 0.304139 | -1.48E-12 | -0.0006316 | 9.93E-14 |
| 3 | 115 | -2.03E+07 | 0.304139 | -2.26E-12 | -0.0003502 | 1.13E-13 |
| 4 | 40 | 2.80E+07 | 0.309286 | -2.81E-12 | 0.0000910 | 9.33E-14 |
| 4 | 75 | 6.07E+06 | 0.309286 | -1.72E-12 | -0.0006213 | 1.13E-13 |
| 4 | 115 | -2.02E+07 | 0.309286 | -2.22E-12 | -0.0003591 | 1.13E-13 |
| 5 | 40 | 2.74E+07 | 0.306575 | -2.74E-12 | 0.0003200 | 1.36E-13 |
| 5 | 75 | 5.44E+06 | 0.306575 | -2.93E-12 | 0.0004295 | 1.05E-13 |
| 5 | 115 | -2.10E+07 | 0.306575 | -2.86E-12 | 0.0002872 | 1.73E-13 |
| 6 | 40 | 2.83E+07 | 0.309016 | -2.72E-12 | 0.0000145 | 1.12E-13 |
| 6 | 75 | 6.63E+06 | 0.309016 | -2.82E-12 | 0.0000612 | 9.77E-14 |
| 6 | 115 | -1.94E+07 | 0.309016 | -2.55E-12 | -0.0001853 | 1.43E-13 |

CONTINUOUSLY TUNABLE OPTICAL DISPERSION COMPENSATION SYNTHESIZERS USING CASCADED ETALONS

RELATED APPLICATION

This application is a continuation of application Ser. No. 11/977,798, filed Oct. 26, 2007 now U.S. Pat. No. 7,706,045.

FIELD OF THE INVENTION

The field of the invention is optical dispersion compensation. More specifically, it is directed to methods for designing cascaded etalons to produce tunable dispersion compensation synthesizers, and methods for tuning them.

BACKGROUND OF THE INVENTION

As optical systems migrate to higher transmission rates, such as 40 Gbs, there is a need to compensate for chromatic dispersion and to optimize residual chromatic dispersion in the system to minimize transmission penalty. Residual dispersion is an artifact of imperfect match between the dispersion in the fiber plant and the fixed dispersion compensators used in typical optical transmission systems. To solve this problem, considerable effort has been devoted to the development of tunable dispersion compensation devices to replace and/or supplement existing fixed dispersion compensation devices. Moreover, as optical transmission systems evolve to more flexible and re-configurable system architectures, there is a need to dynamically compensate for chromatic dispersion as node distances change through reconfiguration or as a result of temperature changes.

To minimize transmission penalty due to chromatic dispersion at high transmission bit rates such as 40 Gbps, close-loop tuning methods are typically used. In the closed-loop method the feedback signal to the controller is correlated to system penalty and the controlled tuning device is a tunable dispersion compensator (TDC). Tuning dispersion in a closed-loop system requires that the device tunes both dispersion and dispersion slope continuously over the complete dispersion range and across all network channels. In available TDCs, as the dispersion is tuned from one value to another, the signal may pass through time periods of unpredictable signal distortion due to uncontrolled dispersion of the TDC before arriving at the desired state. Currently there is no known solution which guarantees avoidance of these periods of additional signal distortion between dispersion setpoints for etalon-based dispersion compensation devices.

There are a number of known approaches to provide tunable dispersion compensation. Technologies includes: Etalons, Fiber-Bragg Gratings (FBG), Arrayed Waveguide Gratings (AWG), Virtual Imaged Phase Array (VIPA), Mach-Zehnder Interferometers (MZI), and Planar Lightwave Circuits (PLC). None of these technologies have produced satisfactory continuous dispersion tuning and/or continuous dispersion slope tuning.

STATEMENT OF THE INVENTION

We have developed a method for designing individual stages of a multiple cascaded etalon TDC device to allow methods for continuous thermo-optic tuning over a desired range without inducing periods of incremental signal distortion between desired dispersion value setpoints. This allows the signal to be compensated without going through periods of incremental impaired quality or dark spots during tuning. The method involves prior knowledge of characterizing each etalon stage, after full assembly, for spectral group delay profile as a function of a control parameter such as temperature. This can be accomplished through modeling or characterization to account for performance variations that are due to allowed manufacturing tolerances. The group delay profiles are then fitted to an expected theoretical group delay profile based on the etalon structure design. Typical parameters varied to achieve the best fit are: surface reflectivity, cavity free spectral range (FSR), and a group delay offset and slope term to account for uncertainty in group delay measurements. The resulting theoretical etalon group delay profiles of the individual stages are used in a series of solver algorithms to identify etalon positions (temperatures) that best synthesize a target dispersion and, optionally, dispersion slope over a target dispersion passband (channel width) and wavelength range (set of channels).

BRIEF DESCRIPTION OF THE DRAWING

The invention may be better understood when considered in conjunction with the drawing in which.

DETAILED DESCRIPTION Of The INVENTION

The design methods of the invention are intended for any suitable etalon structures. The preferred embodiments are Fabry-Pérot (FP) etalons, Gires-Tournoise (GT) etalons, and combinations thereof. The description below focuses mainly on etalons and combinations of etalons that include at least one FP etalon, although it should be understood that the invention is not so limited.

Figure 1:
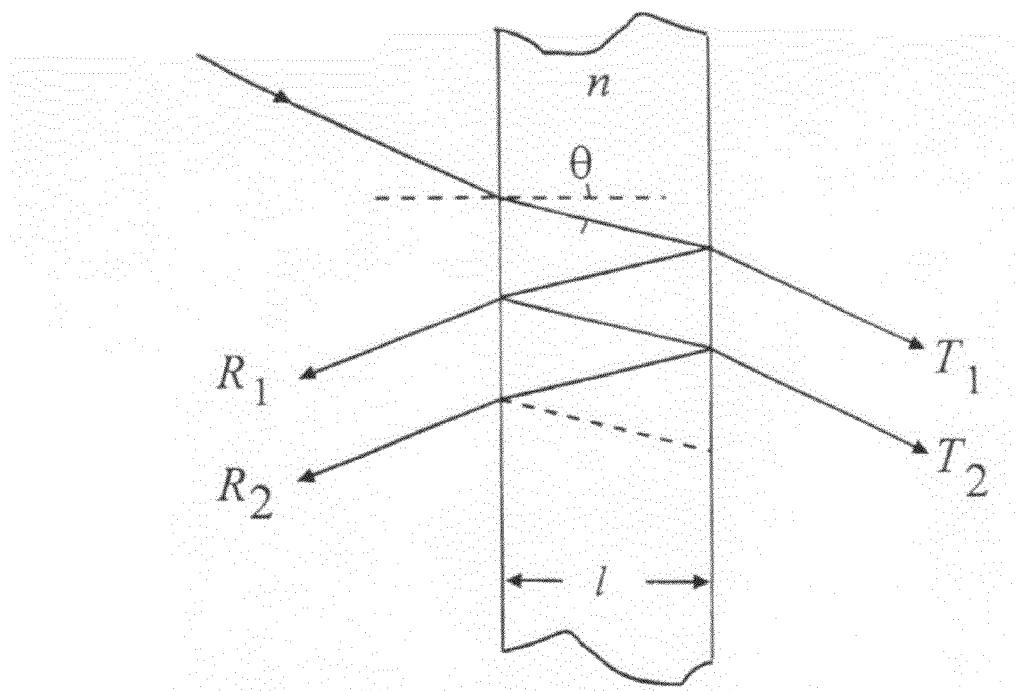
FIG. 1 is a schematic diagram illustrating the operation of a typical etalon.

A Fabry-Pérot etalon is typically made of a transparent plate with two reflecting surfaces. An alternate design is composed of a pair of transparent plates with a gap in between, with any pair of the plate surfaces forming two reflecting surfaces The transmission spectrum of a Fabry-Pérot etalon as a function of wavelength exhibits peaks of large transmission corresponding to resonances of the etalon. Referring to FIG. 1, light enters the etalon and undergoes multiple internal reflections. The varying transmission function is caused by interference between the multiple reflections of light between the two reflecting surfaces. Constructive interference occurs if the transmitted beams are in phase, and this corresponds to a high-transmission peak of the etalon. If the transmitted beams are out-of-phase, destructive interference occurs and this corresponds to a transmission minimum. Whether the multiply-reflected beams are in-phase or not depends on the wavelength ($\lambda$) of the light, the angle the light travels through the etalon ($\theta$), the thickness of the etalon (l) and the refractive index of the material between the reflecting surfaces (n).

Maximum transmission ($T_e=1$) occurs when the optical path length difference (2nl cos $\theta$) between each transmitted beam is an integer multiple of the wavelength. In the absence of absorption, the reflectivity of the etalon $R_e$ is the complement of the transmission, such that $T_e+R_e=1$, and this occurs when the path-length difference is equal to half an odd multiple of the wavelength.

The finesse of the device can be tuned by varying the reflectivity of the surface(s) of the etalon. The finesse of the etalon is related to the etalon reflectivities by:

$$F = \frac{\pi(R_1 R_2)^{1/4}}{1 - (R_1 R_2)^{1/2}}$$

where F is the finesse, $R_1$, $R_2$ are the reflectivity of facet 1 and facet 2 of etalon. The GT etalon is essentially an FP etalon with one surface highly reflective.

The wavelength separation between adjacent transmission peaks is the free spectral range (FSR) of the etalon, $\Delta\lambda$, and is given by:

$$\Delta\lambda = \lambda_0^2 / 2n / \cos\Theta\tau$$

where $\lambda_0$ is the central wavelength of the nearest transmission peak. The FSR is related to the full-width half-maximum by the finesse of the etalon. Etalons with high finesse show sharper transmission peaks with lower minimum transmission coefficients.

The FSR of an etalon is temperature sensitive because the optical length of the etalon or the refractive index within the etalon is typically temperature sensitive. This temperature sensitivity, typically unwanted, can be used to advantage, if controlled, to tune a device that incorporates an etalon. In a TDC, the dispersion of the device can be changed by changing the temperature of the etalon. In a TDC with a single etalon device, this tuning method may be relatively straightforward. However, the tuning range and dispersion slope capability is limited.

To increase the tuning range and improve the dispersion slope, multiple stages are used. In principle, a multiple cavity etalon, where basically several etalon plates are optically coupled together, could be used to increase the dispersion tuning range or slope. However, in practice the etalons do not have the same group delay profile. That means that for an effective TDC, the control parameter, such as temperature, of each stage should be independently controlled. It also means that each stage should be physically separate from other stages, sufficiently removed to allow the temperature of the etalon(s) in each stage to be independently controlled.

As mentioned above, obtaining a desired tuning result with a single stage is straightforward, although a single stage TDC is of limited interest. But the problem becomes rapidly more complex as stages are added to obtain a more broadly useful TDC. Tuning parameters in a one or two stage TDC may be related using an empirically based method. However, achieving useful compensation tuning in a TDC with three or more stages requires a new design approach.

Figure 2:
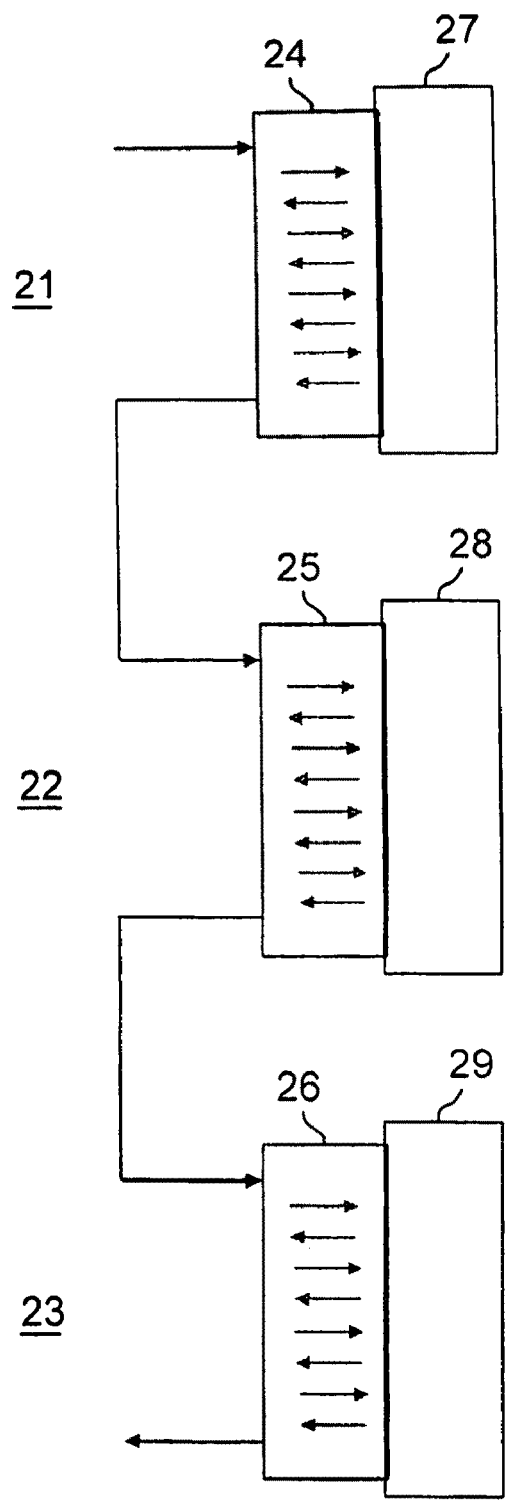
FIG. 2 is a schematic representation of a three stage cascaded TDC using etalons with individual temperature controls.

FIG. 2 shows a TDC device with three stages. 21, 22, 23. The three stages are optically coupled by means (not shown) that connects the stages serially as indicated in the figure. Each of the three stages comprises an etalon 24, 25, 26, and each is provided with an individual temperature control 27, 28, 29. Two stages in the device is a practical minimum for the methods described here. However, it is anticipated that most applications will employ at least three stages. Designing TDC devices with more, and many more, stages is the objective of these methods. It is desirable for the TDC device to be tunable over a range of at least 50 picoseconds (ps) per nanometer (nm), and preferably at least 200 ps/nm. For this result the number of stages, using conventional etalons, would typically exceed 5. We have designed etalons with even larger tuning ranges that use 12, 14, or 16 stages.

The design methods of primary interest here are for optical transmission systems that typically operate at and near 1.55 microns. This means that the materials used for the etalons should have a transparent window around 1.55 microns. However, the design methods are useful for other wavelength regimes as well. The wavelength range desired for many system applications is 1.525 to 1.570 microns. That range is used for demonstrating the methods of the invention.

The structure of the etalons is essentially conventional, each comprising a transparent plate with parallel boundaries. A variety of materials may be used, with the choice dependent in part on the signal wavelength, as just indicated. The optical characteristics of etalons vary with temperature due to at least two parameters. The variation of refractive index with temperature, commonly referred to as the thermo-optic effect, and written as dn/dt, which changes the optical path length between the optical interfaces, and the coefficient of thermal expansion (CTE) which changes the physical spacing between the optical interfaces. In standard etalon device design, the optical sensitivity of the device to temperature changes is minimized. Materials may be chosen that have low dn/dt, and/or low CTE. Materials may also be chosen in which the dn/dt and the CTE are opposite in sign and compensate. Common materials for etalons are fused quartz, tantalum pentoxide or niobium pentoxide. Semiconductor materials or glasses may also be used.

It is preferred that the design methods of this invention be based on silicon as the bulk etalon substrate material. Silicon has a large thermo-optic coefficient and therefore is contra indicated for most optical devices. However, amorphous silicon, polysilicon, and preferably single crystal silicon, are recommended for the methods described here because a large thermo-optic coefficient is desirable. The thermo-optic coefficient of single crystal silicon is approximately 1.9 to 2.4× $10^{-4}$ per degree K. over the temperature ranges used for tuning the etalons.

Figure 3:
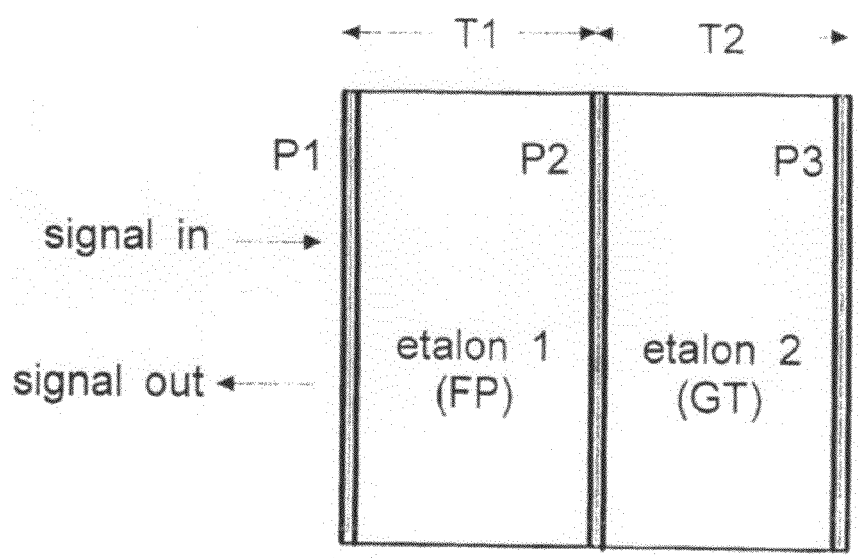
FIG. 3 is a schematic representation of a dual-cavity etalon used in preferred designs produced by the methods of the invention.

An embodiment of a TDC device for which the method of the invention is especially suitably applied is shown in FIG. 3. In this embodiment a twin cavity etalon is used in each stage. The heating element (not shown) is adjacent to etalon 2, as suggested by FIG. 2. The preferred form of twin cavity etalon is a combination FP/GT etalon. In the FP cavity of the twin cavity etalon, both surfaces have a reflectivity <<100%, while in the GT cavity of the twin cavity etalon the reflectivity of one surface of the etalon is <<100% and the reflectivity of the other surface is near 100%. FIG. 3 shows the Fabry-Pérot cavity as etalon 1, and the GT cavity as etalon 2. Relevant parameters for the twin cavity are T1, the thickness of the Fabry-Pérot etalon, T2, the thickness of the GT etalon, P1, the reflectivity of the input interface of the Fabry-Pérot etalon, P3, the reflectivity of the back face (high reflectivity face) of the GT etalon, and P2 the reflectivity of the interface shared between the two cavities. The surface P1 is a low reflectivity surface, P2 is a medium reflective surface and P3 is a high reflectivity surface. In general the reflectivity of P1 may vary over a range 0-25%, the reflectivity of P2 may vary over a range 35-80%, and the reflectivity of P3 may vary over a range of 98-100%, preferably 99.5 to 100%.

Typical dimensions for the etalons are 1.8 mm square, with the optical window approximately 1.5 mm square. Thickness, T1 and T2, is typically approximately 0.8 mm. Suitable reflectance values, with reference to FIG. 3, are shown in the following table.

Slicon Dual-Cavity Etalon Variant Table

| Part Number | P1 Reflectance | P2 Reflectance | P3 Reflectance | FSR Mismatch (T1-T2) |
|---|---|---|---|---|
| Class A Etalon | 3.5 ± 2% | 40.5 ± 2% | >99.95% | 0-2/+3 MHz |
| Class B Etalon | 6.5 ± 2% | 53.0 ± 2% | >99.95% | 0-2/+3 MHz |
| Class C Etalon | 10.5 ± 2% | 65.5 ± 2% | >99.95% | 0-1/+3 MHZ |
| Class D Etalon | 15.0 ± 1% | 74.0 ± 1% | >99.95% | 0-1/+2 MHz |
| Class E Etalon | 19.0 ± 2% | 79.5 ± 2% | >99.95% | 0-2/+3 MHz |

The use of twin cavities as shown in FIG. 3, reduces the complexity of the tuning mechanism while still allowing the tuning range to be increased. For the methods of the invention, prior knowledge, via modeling and/or characterization, of each twin cavity stage is required in terms of the spectral group delay profile as if the twin cavity etalon is a single cavity etalon. However, the twin cavity etalon widens the dispersion tuning range as if it were two stages. The embodiment of FIG. 3 shows twin cavity etalons for reducing the tuning complexity of the device, more than two cavities may be optically coupled together for the same purpose.

It will be evident to those skilled in the art that the tuning methods described here rely on changing the control parameter such as temperature of the etalon stages over a significant range, T2-T1. There is an inherent and unavoidable time delay, D=t2−t1, required to effect the temperature change. This inherent delay D may be several seconds. It is important to users of these devices what occurs during that time delay. In most cases with thermally tuned TDC devices, and in all cases with complex multi-stage thermo-optic tuning of TDC devices, the signal will experience one or more periods of unpredictable distortion due to uncontrolled dispersion of the TDC. It is not uncommon for the signal to see excessive distortion momentarily as the device is tuned. The design method described in detail below has the capability of avoiding periods of unpredictable distortion in the signal during tuning. It also has the more demanding objective of continuous tuning. Continuous dispersion tuning means that the signal at time t1 undergoes predictable and monotonic change in dispersion through the delay period until it reaches the final dispersion value at time t2.

The design method of the invention requires knowledge of the group delay of each stage which can be accomplished through one or more steps of characterization after full assembly, for spectral group delay profile as a function of the control parameter such as temperature. Using characterization accounts for performance variations that are due to allowed manufacturing tolerances. The group delay profiles are then fitted to an expected theoretical group delay profile based on plane-wave matrix modeling of coupled interferometers. Typical parameters varied to achieve the best fit are: surface 1 and 2 reflectivity, cavity 1 and 2 free spectral range (FSR), and a group delay offset and slope term to account for uncertainty in group delay measurements. The resulting theoretical etalon group delay profiles of the individual stages are used in a series of solver algorithms to identify etalon positions (temperatures) that best synthesize a target dispersion and dispersion slope over a target dispersion passband (channel width) and wavelength range (set of channels). Constraints in the solver algorithm include the etalon temperature range, and the requirement to avoid significant discontinuities over dispersion range. The solver repeats this process over the range of target dispersions to find discrete solutions at 'coarse' dispersion increments (e.g. 10-200 ps/nm) to create a complete etalon mapping of temperature versus dispersion using previous solution as a start point. This mapping is then used by the embedded controls to set the etalon temperatures for any desired dispersion within the stated range. The constraints used as part of the solver algorithms provide a mapping that is continuous such that the discrete solutions, obtained at 'coarse' dispersion increments (e.g. 10-200 ps/nm), can be used by the controller to set any 'fine' dispersion increment (<1 ps/nm) by interpolating the 'coarse' positions to solve for etalon temperatures. This results in a device that meets dispersion accuracy, and group delay ripple performance, continuously over the dispersion set points in the stated range of dispersion.

FIGS. 4-7 illustrate typical parameters used for designing TDC synthesizers according to the methods of the invention. An example of the methods is described below in conjunction with these figures.

Step 1. Characterize Each Individual Stage by Measured Group Delay or Phase.

Figure 4:
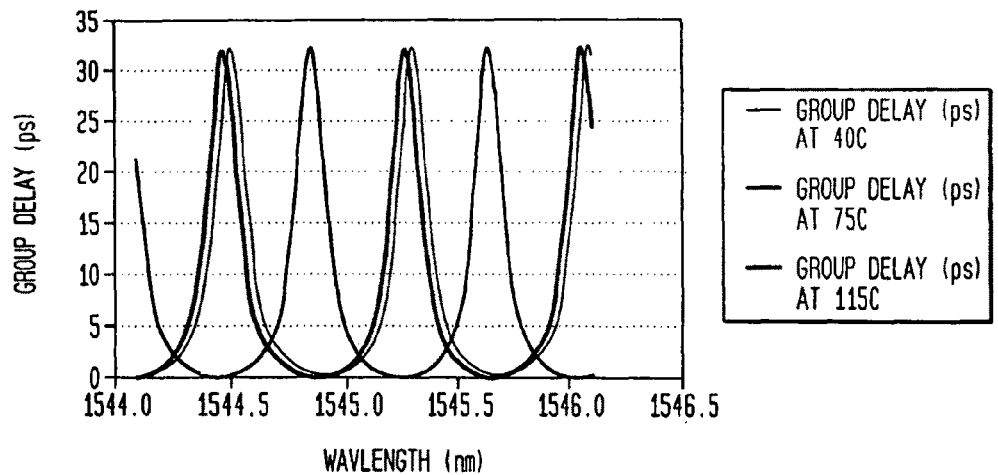
FIG. 4 is a plot of group delay in picoseconds vs. wavelength showing the measured group delay profile for an individual etalon stage at three different temperatures.

With reference to FIG. 4, each individual stage is characterized by measured Group Delay (or Phase) as a function of wavelength and temperature over one or more FSR's within ranges of operating channel(s), wavelength and temperature. This step follows a recognition that fabricating etalons for precision thermo-optically tuned TDC devices according to demanding manufacturing specifications is generally not sufficient to obtain the result desired here, namely continuous tuning between dispersion compensation values. As indicated previously, continuous tuning between dispersion compensation values means that the signal quality undergoes continuous improvement during tuning. To achieve this, it has been found useful to individually characterize each etalon stage as a preliminary to the design of cascaded stages. This step produces a desired group delay function using multiple concatenated group delay stages. Characterization is done at multiple wavelength channels, multiple temperatures, and in fine enough increments to account for any nonlinearities in the group delay response as a function of wavelength channel and temperature. FIG. 4 is a plot of the group delay vs. wavelength at three different temperatures. 40 C., 75 C., and 115 C. Characterization includes measurement data and/or predictive data.

Step 2. Fit Group Delay Measured Responses Using an Etalon Based Physical Model.

Figure 5:
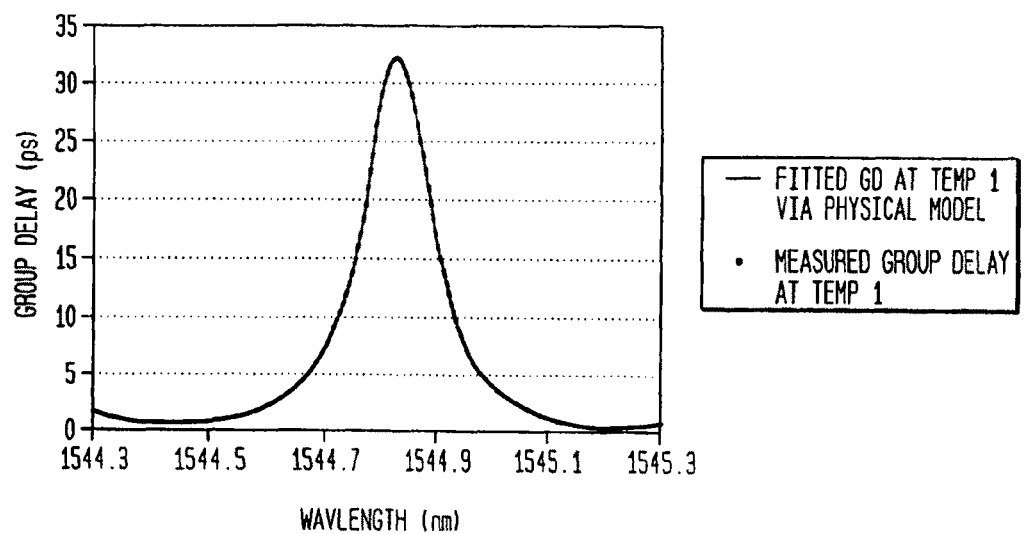
FIG. 5 is a graph representing the step of fitting the physical model of the group delay at a given temperature setting to the measured group delay at that temperature.

With reference to FIG. 5, the measured group delay responses are fit to the etalon based physical model with variables being surface reflectance, cavity FSR/thickness, and temperature coefficients. FIG. 5 shows data for several individual etalon stages (multiple shades of curves related to left ordinate) and the group delay curve (heavy black line related to right ordinate). Fitting the data to match a physical etalon model will produce an accurate mathematical representation/model of the device response that can easily be computed at any frequency. Variations in surface reflectances and cavity FSR/thickness and temperature coefficients that occur in manufacture are accounted for to ensure that the model accurately represents the actual device.

Step 3. Solve Each Individual Stage Fabry-Pérot Plane-Wave Matrix Model Parameters as a Function of Temperature.

Achieving a desired overall concatenated group delay requires knowledge of the individual stage group delay response as a function of temperature because temperature is the control parameter used to position each stage. Manufacturing variations, including surface reflectances, cavity FSR/thickness, and temperature coefficients, will be accounted for to enable the model to accurately represent the actual device at any temperature over the expected temperature tuning range. Prior to fitting, group delay measurements should be done in adequate temperature increments to quantify and model any non-linearities in group delay response.

Step 4. Provide Dispersion Synthesizer Inputs

The dispersion synthesizer is the mathematical engine that adjusts the temperatures of individual etalon stages (the outputs from the physical model) to produce a desired concatenated dispersion and/or group delay response. Inputs to the synthesizer include: desired group delay and/or dispersion response over one or more ITU channel, bandwidth over which the response is required, Figure of Merit to optimize the temperature ranges of the individual etalon stages, and the physical model of the etalon stages. The synthesizer uses one or more optimization algorithms to find a combination of etalon temperatures that produce an acceptable result. Optimization models include genetic and gradient-based classifications of models. A genetic algorithm is used for initial partial solution at a maximum or minimum dispersion, then gradient-based algorithm uses the genetic partial solution and refines it. This multiple model approach optimizes efficiency and probability of achieving a global solution.

Step 5. Define the Figure of Merit

The metric used for the optimization is a figure of merit which quantifies how well the simulated response meets the requirements of the desired response. (The desired response may be group delay or dispersion.) A suitable figure of merit can be defined by: best fit to a target dispersion, best fit to a target group delay, etc. A tolerance value is specified and used to tell the optimizer when it has found an acceptable solution.

Step 6. Solve for Individual Etalon Stage Temperatures for the Minimum and Maximum Desired Dispersion Target(s).

Figures 6, 7:
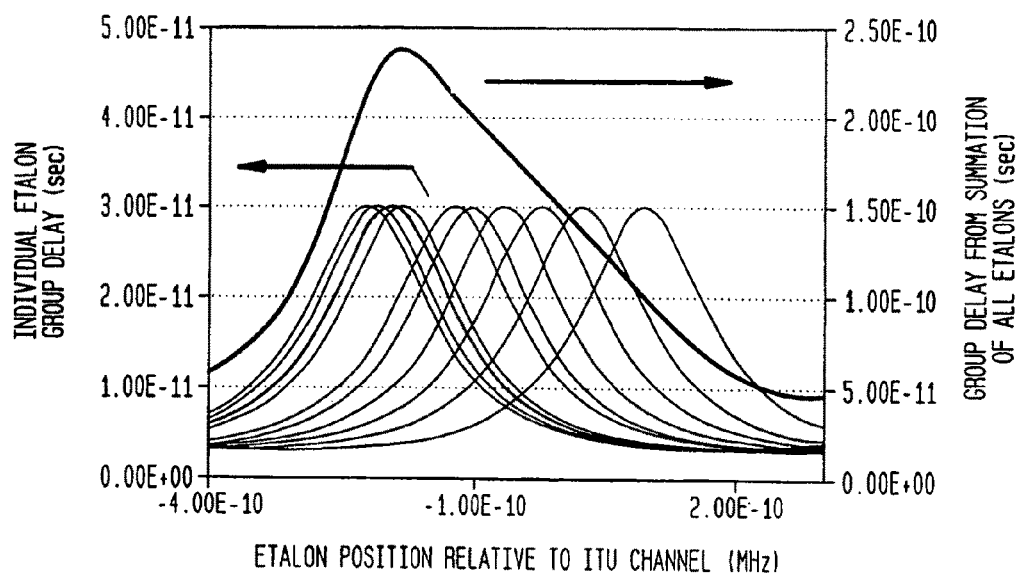
FIG. 6 is a chart of fit results from the Fabry-Pérot physical model.
FIG. 7 is a plot of individual group delay (left ordinate, multiple curves) and the synthesized group delay (right ordinate, dark curve) vs. channel width in MHz showing the expanded channel produced by cascading multiple etalon stages.

Because the device is tunable, more than one desired dispersion or group delay response and the optimization begins with a single target. Since there are multiple solutions for any given target and the solutions are not independent (to satisfy continuity), an optimizer algorithm is more effective with finely spaced and ordered targets. The resulting data may be used in a plot such as that shown in FIG. 7. FIG. 7 plots the desired dispersion setpoint vs. the etalon temperature for a 12 stage TDC device. As is evident, to achieve the desired TDC tuning range, four of the stages undergo very significant temperature excursions, i.e. about 35 degrees C.

Step 7. Iteratively solve individual etalon stage temperatures for each dispersion/group delay target(s) at a finite dispersion interval in a systematic and continuous fashion. Since the device tunes continuously from one target to another, the solutions for the individual targets should be continuous. Continuous solutions are defined by the relative behavior of each stage temperature as it tunes from one target to another. To be continuous, each stage temperature should move monotonically (or very near monotonically) as the device is tuned over the range of dispersion or group delay targets. If each stage is monotonic, the resulting dispersion or group delay response of the device between two targets (during transition) will lie within the range of the two targets, i.e. not lower than either target or higher than either target. The interval at which the solutions are determined through optimization should be adequate to guarantee that targets within the interval are valid and the device will achieve the expected response performance at the expected intervals.

Step 8. Create a Dispersion Map from the Optimization Outputs.

Figure 8:
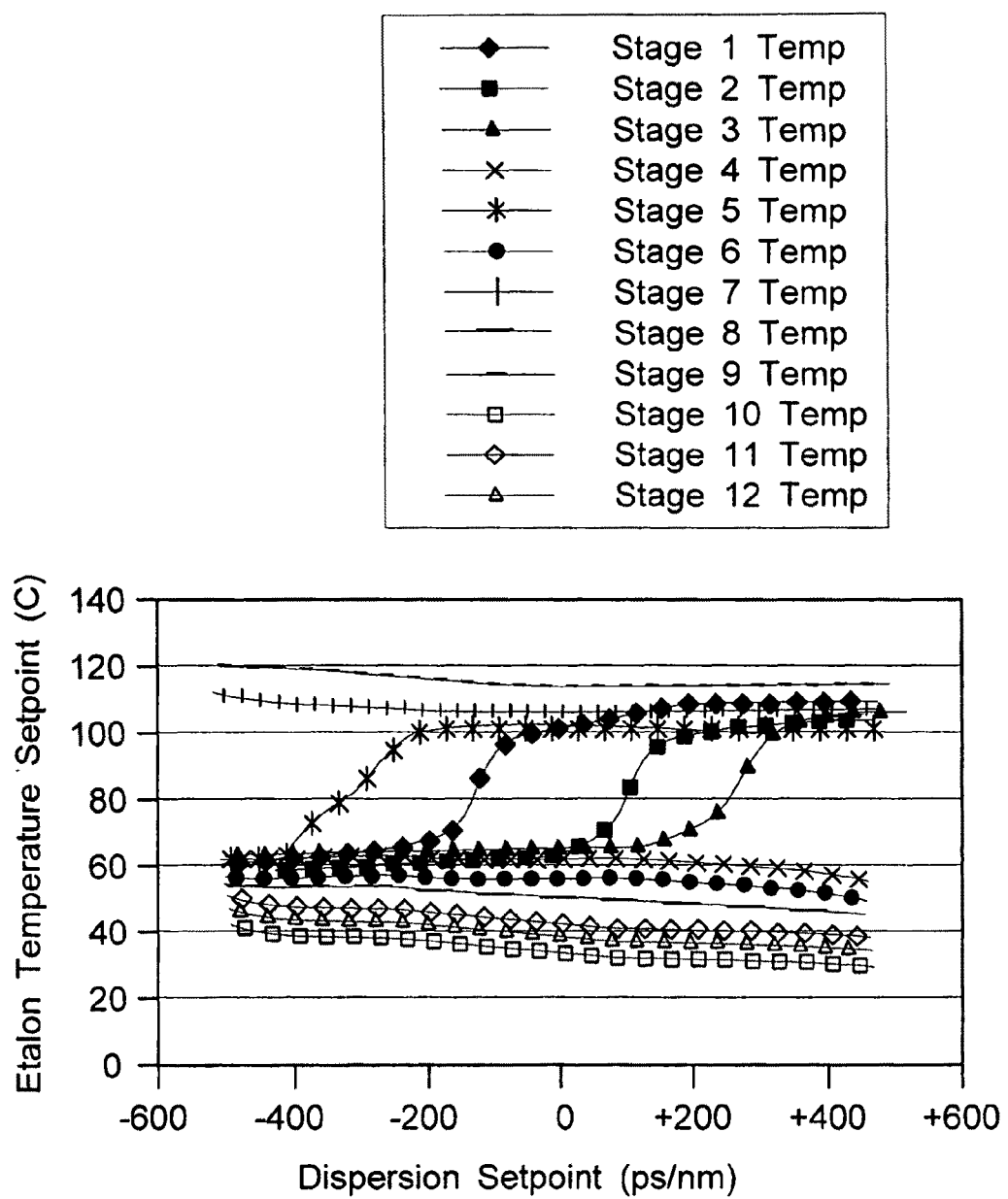
FIG. 8 is a plot for 12 individual etalon stages showing dispersion vs. temperature.
Figure 9:
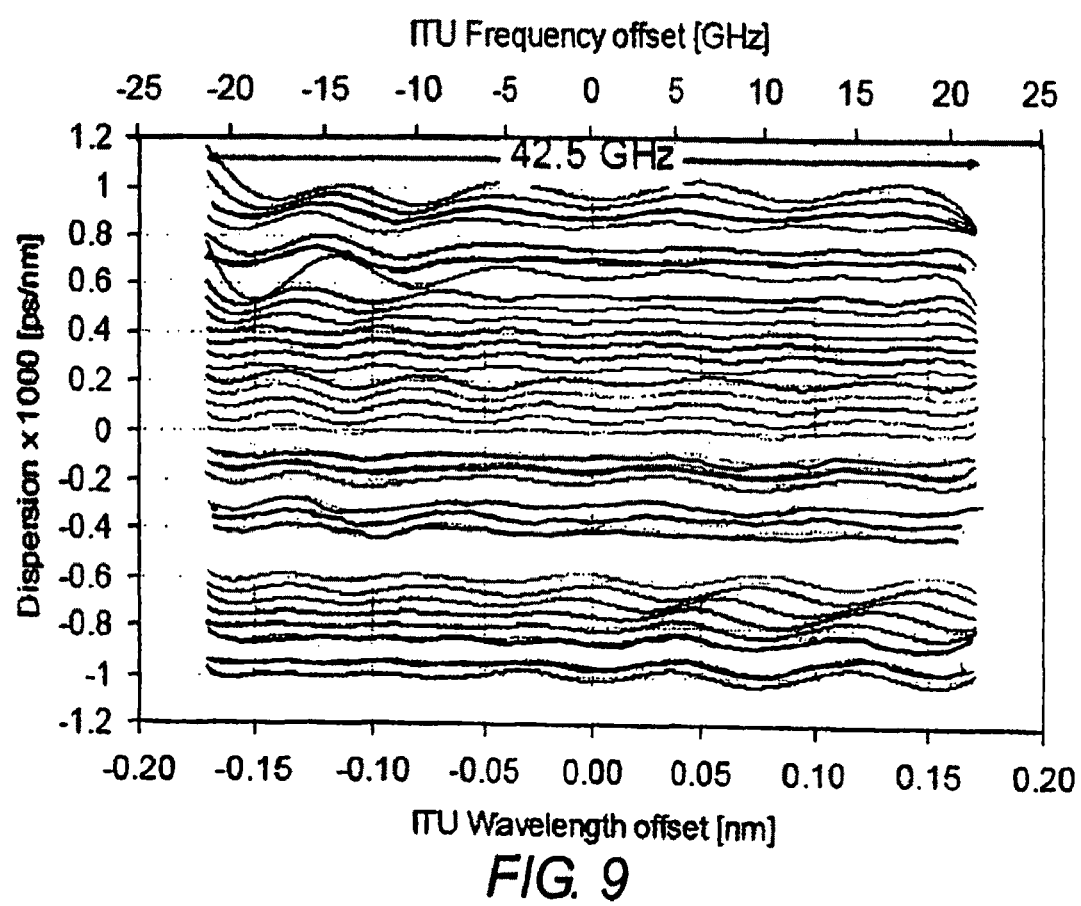
FIG. 9 is a plot of dispersion vs. ITU wavelength for the 12 stages of FIG. 8.
Figure 10:
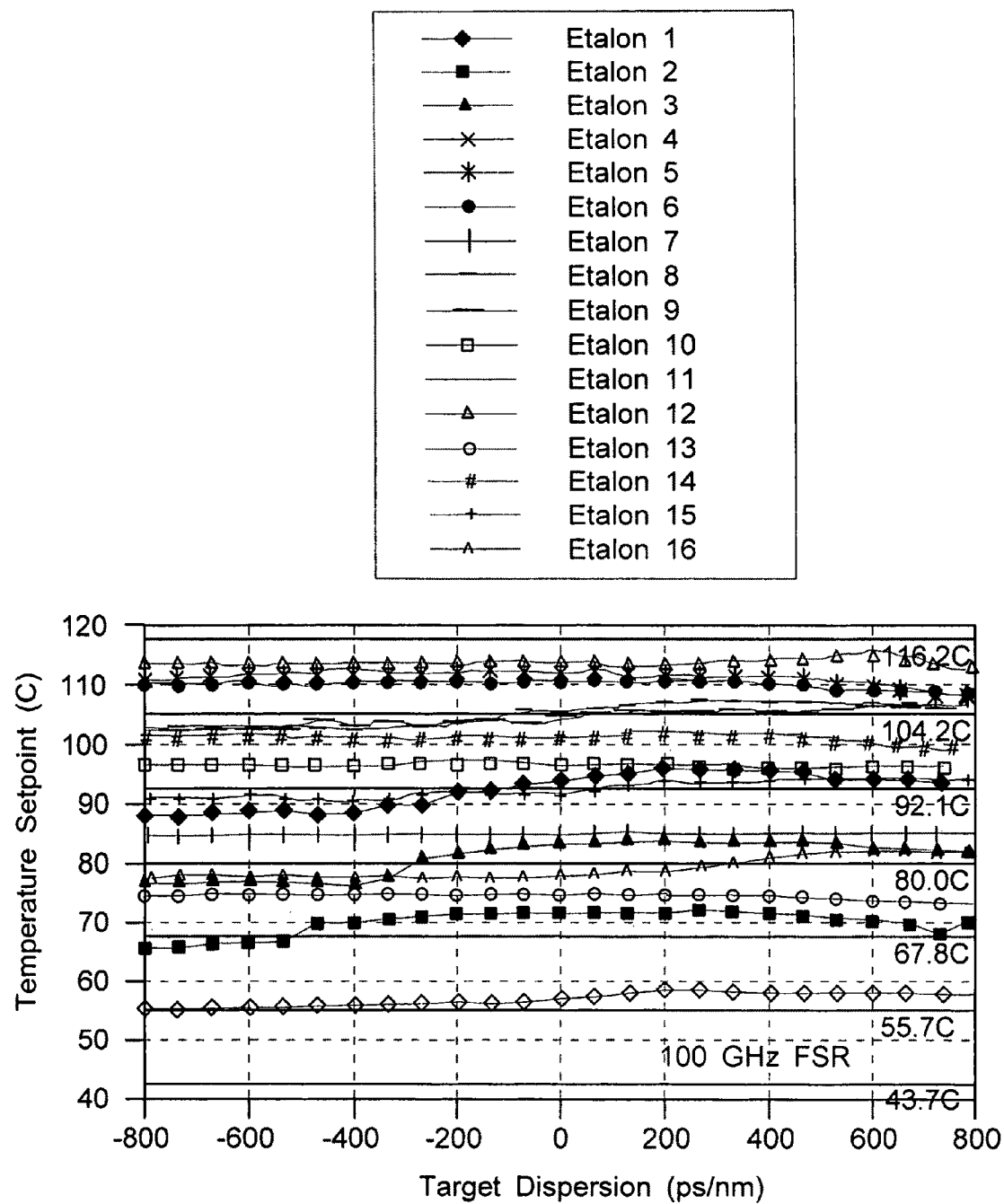
FIG. 10 is a plot of target dispersion vs. temperature set point giving en example of a 12 stage TDC device designed according to on aspect of the invention.
Figure 11:
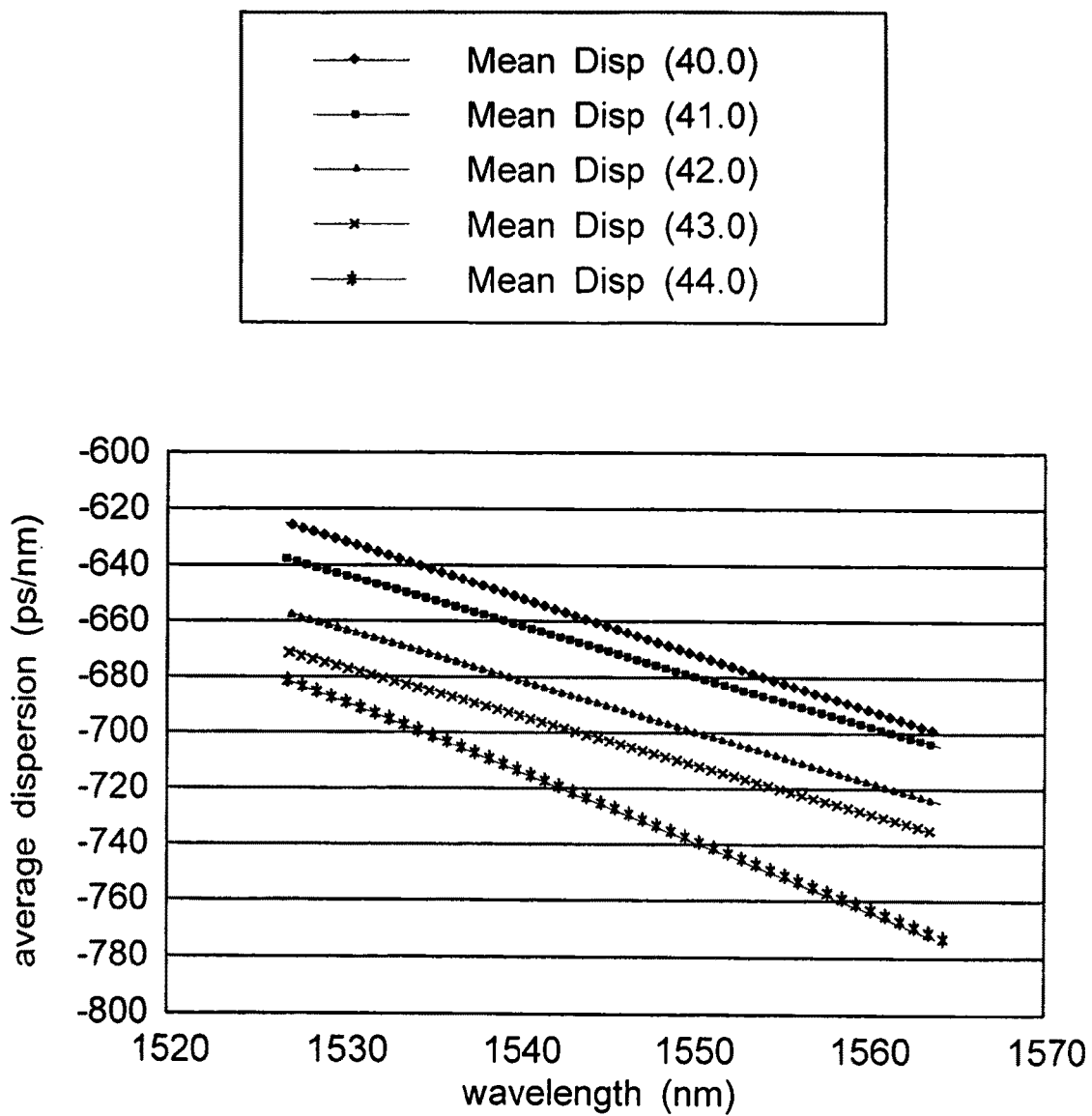
FIG. 11 is a plot of average dispersion vs. wavelength illustrating dispersion slope compensation according to another aspect of the invention.

When the optimizations are complete, a 2-dimensional array of dispersion or group delay target versus stage etalon temperature is generated and used for setting dispersion/group delay targets. This data can be downloaded to the device controller for setting and controlling dispersion/group delay setpoints. A typical dispersion map is shown in FIG. 8, where dispersion is plotted as the ordinate vs. wavelength as the abscissa.

Step 9. Estimate Individual Etalon Stage Temperatures for any Desired Dispersion/Group Delay within a Range in the Dispersion Map Using Appropriate Interpolation Model.

Since the method described above produces a series of continuous dispersion solutions for the individual etalon stage temperatures, the device can operate at dispersion targets that lie between any 2 adjacent solutions. To estimate the individual etalon stage temperatures for dispersion/group delay targets that lie between 2 adjacent solutions, a simple interpolation of each of the etalon stage temperatures between those same 2 adjacent solutions can be used.

Whereas the foregoing description deals mainly with devices used for dispersion compensation it will be evident to those skilled in the art that the devices described are capable of tuning dispersion values for other applications.

Those skilled in the art will appreciate that in situations described above wherein the signal is described as "hitless" while the device is tuned means that the TDC is in use during tuning, i.e., an optical signal is being transmitted through the WDM system that incorporates the TDC. It should also be evident that the TDC can be tuned while the system is not in service, i.e. when there is no optical signal through the TDC device. However, in most cases dynamic tuning will be employed, and the signal quality can be observed as the TDC is tuned. In some cases, an optical test signal may be employed.

It should be evident that the method just described can be fully automated to provide continuous dispersion compensation for the optical system. When a dispersion drift is detected, the system will automatically compensate for the drift as soon as it is detected. However, in many cases the system dispersion change is not a drift but an incremental change, sometimes a large incremental change. This may happen if the system is reconfigured for new or repaired services. Thus the TDC may be required to compensate over large dispersion values, and thus make large temperature excursions.

Various additional modifications of this invention will occur to those skilled in the art. All deviations from the specific teachings of this specification that basically rely on the principles and their equivalents through which the art has been advanced are properly considered within the scope of the invention as described and claimed.

The invention claimed is:

1. A method for tuning a multistage etalon tunable dispersion compensator having at least two etalon stages, the method comprising the steps of:

characterizing a group delay profile for each of the etalon stages as a function of wavelength and temperature based on actual measurements of group delays of the etalon stages over a range of wavelengths and temperatures, wherein each characterized group delay profile is based on the actual measurements to account for variations in surface reflectance, cavity free spectral range, and temperature coefficient of the corresponding etalon stage;

determining a target control parameter for each of the etalon stages based on the characterized group delay profiles and a target dispersion value; and controlling each of the etalon stages according to the target control parameter thereof.

2. The method of claim 1, wherein the target control parameter for each of the etalon stages is a cavity free spectral range (FSR) thereof.

3. The method of claim 2, wherein a temperature of each of the etalon stages is controlled to achieve the target FSR.

4. The method of claim 3, wherein the temperature of each of the etalon stages is controlled using a heating device attached thereto.

5. The method of claim 1, wherein the target control parameters of the etalon stages are controlled to change a resulting dispersion value in a continuous and monotonic manner.

6. A tunable dispersion compensator comprising:

two or more etalon stages connected in a cascasded manner, each etalon stage configured with a heating device that is controlled to change a temperature of the etalon stage to a target temperature, wherein the target temperature for each of the etalon stages is set by characterizing a group delay profile of the etalon stage as a function of wavelength and temperature based on actual measurements of group delays of the etalon stage over a range of wavelengths and temperatures, wherein each characterized group delay profile is based on the actual measurements to account for variations in surface reflectance, cavity free spectral range, and temperature coefficient of the corresponding etalon stage, and determining the target temperature based on the characterized group delay profile of the etalon stage and a target dispersion value, and the etalon stages are controlled to the target temperatures to change a resulting dispersion value in a continuous and monotonic manner.

7. The tunable dispersion compensator of claim 6, wherein at least three etalon stages are connected in a cascasded manner.

8. The tunable dispersion compensator of claim 6, wherein each etalon stage includes an etalon made of silicon.

9. The tunable dispersion compensator of claim 8, wherein the etalon includes a Fabry-Perot etalon.

10. The tunable dispersion compensator of claim 8, wherein the etalon includes a Gires-Tournois etalon.

11. The tunable dispersion compensator of claim 6, wherein each etalon stage includes a dual cavity etalon including a Fabry-Perot etalon and a Gires-Tournois etalon.

* * * * *

UNITED STATES PATENT AND TRADEMARK OFFICE
CERTIFICATE OF CORRECTION

PATENT NO. : 8,213,073 B2  Page 1 of 1
APPLICATION NO. : 12/592812
DATED : July 3, 2012
INVENTOR(S) : Summa et al.

It is certified that error appears in the above-identified patent and that said Letters Patent is hereby corrected as shown below:

In the Claims:

Column 10, Claim 6, Line 5, please delete "cascasded" and insert -- cascaded -- therefor;

Column 10, Claim 7, Line 24, please delete "cascasded" and insert -- cascaded -- therefor.

Signed and Sealed this
First Day of January, 2013

David J. Kappos
*Director of the United States Patent and Trademark Office*